(12) United States Patent
Bieringer et al.

(10) Patent No.: US 7,058,489 B2
(45) Date of Patent: Jun. 6, 2006

(54) METHOD AND DEVICE FOR TREATING SUSPECTED ERRORS

(75) Inventors: Mathias Bieringer, Illingen (DE); Klaus Landesfeind, Backnang (DE); Dirk Ortlinghaus, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 10/466,052

(22) PCT Filed: Nov. 8, 2002

(86) PCT No.: PCT/DE02/04130

§ 371 (c)(1),
(2), (4) Date: Dec. 16, 2003

(87) PCT Pub. No.: WO03/039929

PCT Pub. Date: May 15, 2003

(65) Prior Publication Data

US 2004/0090323 A1 May 13, 2004

(30) Foreign Application Priority Data

Nov. 9, 2001 (DE) .................................. 101 55 228

(51) Int. Cl.
*G06F 7/00* (2006.01)
(52) U.S. Cl. .......................... 701/34; 701/70; 700/78; 702/90; 714/100
(58) Field of Classification Search ............ 701/70–74, 701/82, 90, 34; 180/197; 246/168.1; 303/138; 714/100; 702/90; 700/78
See application file for complete search history.

(56) References Cited

U.S. PATENT DOCUMENTS

| 3,669,403 A | * | 6/1972 | Slavin et al. ............ 251/30.01 |
| 3,754,796 A | * | 8/1973 | Slavin et al. ............ 303/115.3 |
| 6,161,907 A | * | 12/2000 | Luckevich et al. ......... 303/158 |

FOREIGN PATENT DOCUMENTS

| DE | 41 06 704 | 9/1992 |
| DE | 196 36 443 | 3/1998 |
| DE | 196 38 280 | 3/1998 |
| DE | 100 15 225 | 4/2001 |
| DE | 100 64 503 | 7/2002 |
| EP | 0 584 566 | 3/1994 |
| WO | 02 058976 | 8/2002 |

* cited by examiner

*Primary Examiner*—Yonel Beaulieu
(74) *Attorney, Agent, or Firm*—Kenyon & Kenyon LLP

(57) ABSTRACT

A method and a device are provided for producing an error signal and carrying out measures based thereon in a motor vehicle equipped with a wheel-slip control system and/or a wheel deceleration control system. At least one function variable representing the functionality of the wheel-slip control system and/or wheel-deceleration control system may be monitored for an error and if at least one error is detected, the value of at least one error counter may be incremented. When there is at least one detected error, at least one error signal may be output when the value of at least one error counter exceeds a predeterminable limiting value. For at least one error counter, at least two different, predeterminable limiting values coexist simultaneously, and when each of these is exceeded by the counter reading of the at least one error counter, different error signals may be output.

9 Claims, 4 Drawing Sheets

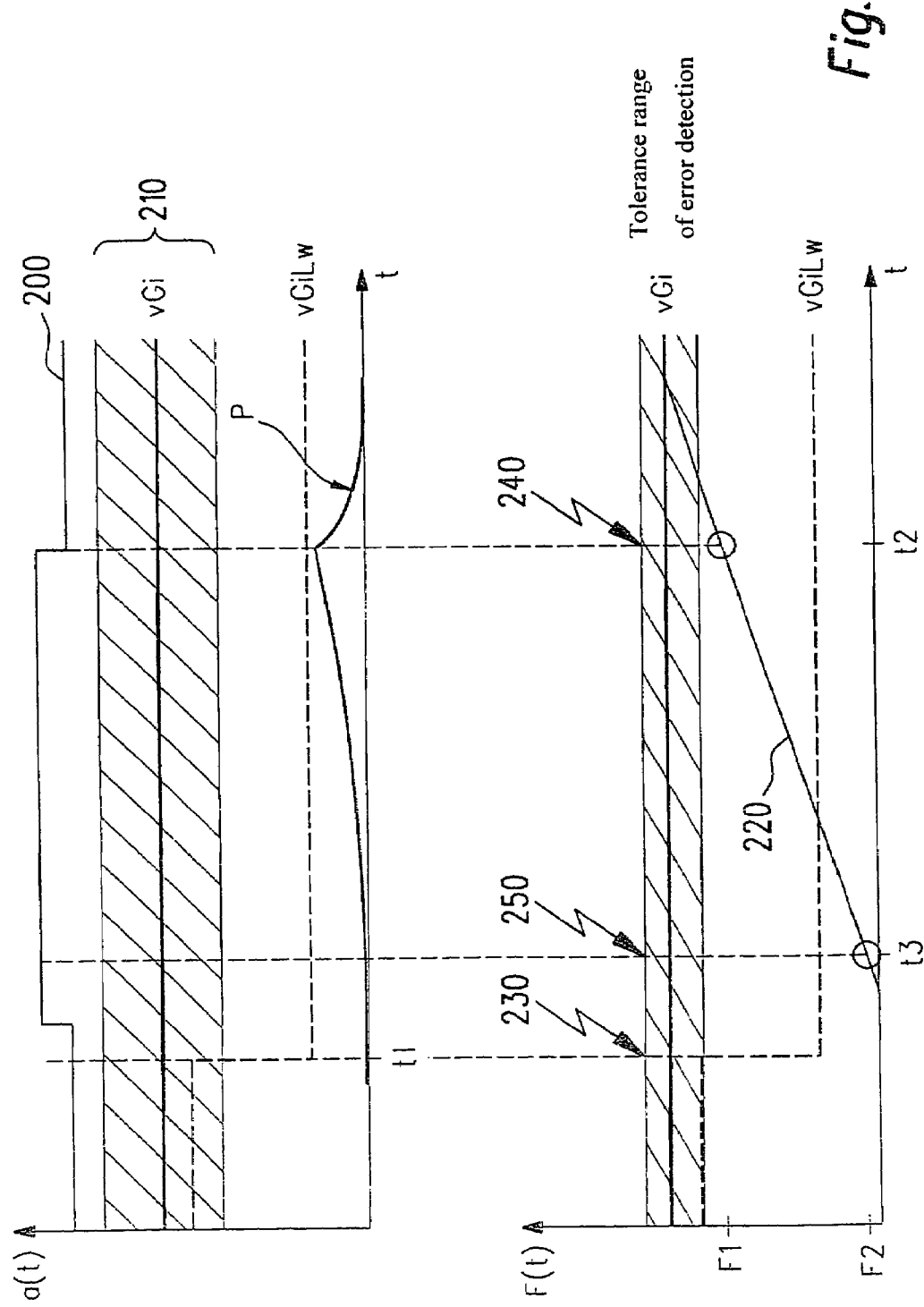

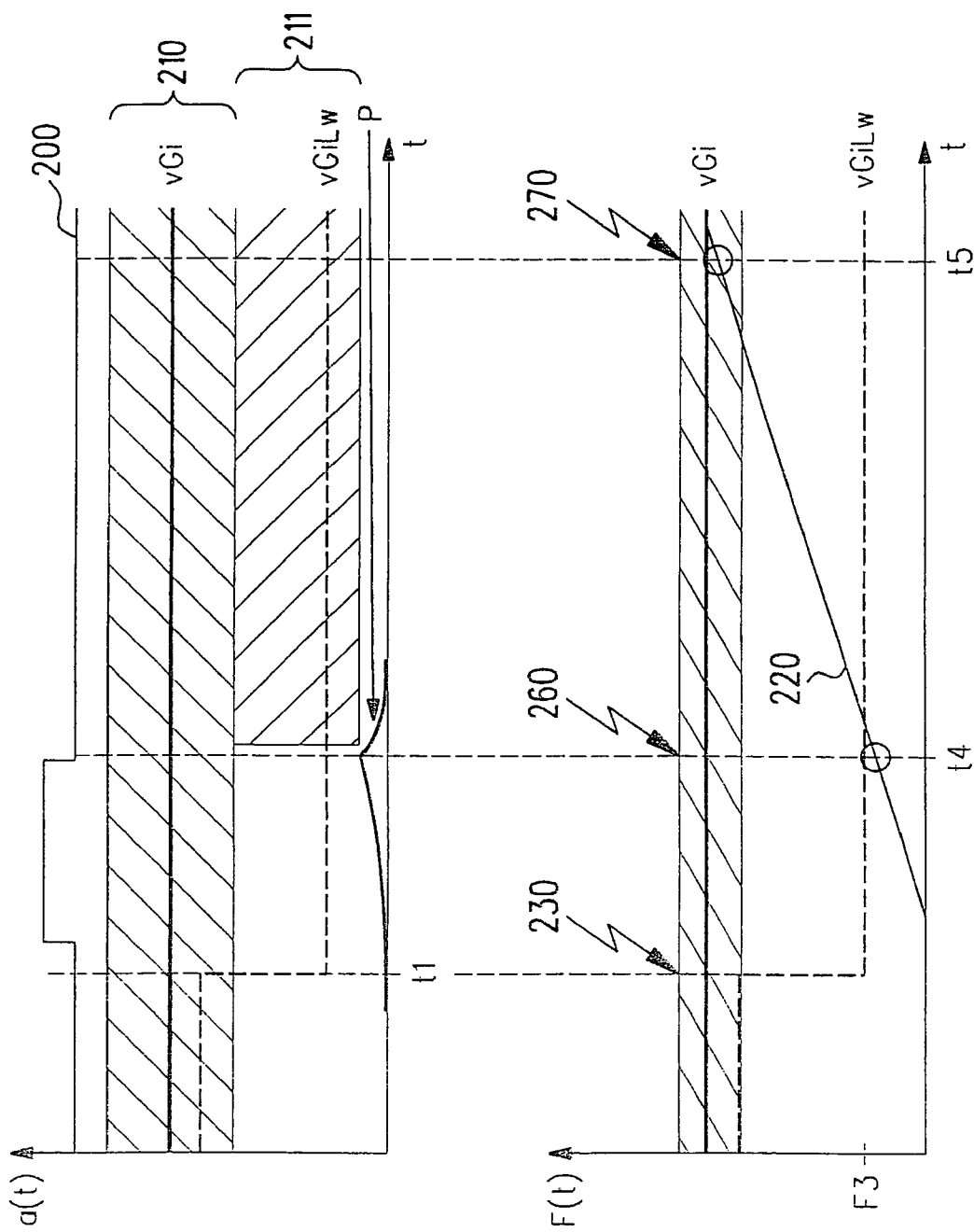

METHOD AND DEVICE FOR TREATING SUSPECTED ERRORS

FIELD OF THE INVENTION

The present invention relates to a method and a device for producing an error signal in a motor vehicle.

BACKGROUND INFORMATION

Published German Patent Application No. 196 38 280 discusses producing an error signal in a motor vehicle having at least two right and left wheels situated in the rear and front region of the vehicle. Signals representing the rotational speeds of the wheels of the vehicle may be recorded. Depending on the signals recorded, the presence of cornering may be furthermore recorded. The signals recorded during cornering may then be compared according to the invention with a specified behavior existing during cornering, whereupon the error signal may be produced, depending on the comparison. Through the comparison, it may be possible to detect incorrect rotational speed sensor signals as a result of incorrectly connecting the wires, for example.

Published German Patent Application No. 196 36 443 discusses a device and a method of monitoring sensors in a vehicle. This device monitors sensors in a vehicle, which produce signals that each represent different physical variables. The device contains means with which comparative variables equally defined for the sensors are determined for at least two sensors, based on at least the signals they produced. Furthermore, the device contains other means with which a reference variable is determined, based on at least the comparative variables determined. Monitoring is carried out in the monitoring means at least for one sensor based on at least the reference variable determined. Aside from the monitoring means, the device contains additional means, with which at least for one sensor a correction of the signal it produces is carried out at least based on the reference variable.

SUMMARY OF THE INVENTION

The present invention relates to a method and a device for treating a suspected error. It is based on a method of producing an error signal and carrying out measures based thereon in a motor vehicle equipped with a wheel-slip control system and/or a wheel deceleration control system, which
- monitors for an error at least one function variable representing the function of the wheel-slip control system and/or wheel-deceleration control system, and
- increments the value of at least one error counter if at least one error is detected, and
- outputs at least one error signal when the value of at least one error counter exceeds a predeterminable limiting value.

Some aspects of the present invention are that
- for at least one error counter, at least two different, predeterminable limiting values coexist simultaneously, and when each of these is exceeded by the counter reading of the at least one error counter, different error signals are output, and
- in response to the different error signals, different measures are carried out in the wheel-slip control system and/or wheel deceleration control system.

As a result, graduated measures may be allowed in the event of a suspected error. In the following, the term "wheel-slip control system" may be used for a clearer description. This may refer to a wheel-slip control system and/or wheel deceleration control system.

For example, a monitoring device in a wheel-slip control system of a motor vehicle may detect a possible error. At the same time, however, the probability of there actually being an error is may not be so great as to justify drastic countermeasures, such as the automatic shutdown of the wheel-slip control system. In this situation, the present invention allows graduated countermeasures to be carried out. For example, when an error is detected once, pressure build-up or pressure reduction procedures affected by the wheel-slip control system may be slowed down. More drastic countermeasures may be taken if the error is detected again or repeatedly. Instead of pressure build-up and pressure reduction procedures, general braking force buildup and braking force reduction procedures may also be slowed down. The braking force buildup and breaking force reduction are not hydraulically controlled in electromechanical brakes (EMB). Therefore, the present invention may be applicable to vehicles equipped with an electromechanical brake system.

An operative range of the present invention may then be provided when the wheel-slip control system is a vehicle dynamics control system, which regulates at least one variable representing the vehicle dynamics toward a desired behavior.

It may be an advantage when the monitoring of at least one function variable representing the function of the wheel-slip control system occurs so that a verification of the fulfillment of at least one given condition takes place.

As discussed above, a slowing down in the wheel brakes of the pressure build-up dynamics may be performed as the first measure when the lowest limiting value is exceeded by one error counter.

It may in effect be generalized (for example, for the electromagnetic brake) that a slowing down of the braking force buildup procedure and braking force reduction procedure is performed in the wheel brakes as the first measure when the lowest limiting value is exceeded by one error counter.

As the second measure, for example, when the second lowest limiting value is exceeded by one error counter, the intervention threshold for at least one brake intervention of the vehicle dynamics control systems is increased and/or at least one intervention of the vehicle dynamics control systems is completely prohibited.

This may mean that, for example as a second measure, when the second lowest limiting value is exceeded by one error counter, a greater deviation of at least one variable representing the vehicle dynamics from its desired behavior is permitted before a control intervention of the vehicle dynamics control system takes place and/or as a second measure at least one control intervention of the vehicle dynamics control system is completely prohibited. Prohibiting a control intervention by a vehicle dynamics control system may mean that at least one type of intervention is completely prohibited, for example an intervention against oversteering, an intervention against understeering, or an intervention on a selected wheel.

A further monitoring measure may be as follows: the monitoring of at least one function variable takes place such that a variable represented by the output signal of a vehicle sensor is compared with a variable calculated through a mathematical model.

A variable represented by the output signal of a vehicle sensor may be compared only during certain driving states to a variable calculated through a mathematical model. This may be related to the validity range of the mathematical model. If the vehicle is in a driving state in which the mathematical model is not valid, then the variable calculated through the mathematical model may also no longer have any substantial significance.

A function variable may be understood as the voltage at one point of the electronic circuit of the wheel-slip control system and/or wheel deceleration control system. However, this may also be understood as the output signal of a sensor or a variable calculated from a mathematical model.

BRIEF DESCRIPTION OF THE DRAWINGS

FIG. 3 shows a first safety concept for a wheel-slip control system, in which a suspected error is already detected before the error detection, and in response thereto, the pressure build-up dynamics in the wheel brakes is slowed down in the course of brake applications induced by the wheel-slip control system.

FIG. 4 shows a second safety concept for a wheel-slip control system, in which a suspected error is already recognized before the error detection, and in response thereto, the intervention thresholds of the vehicle dynamics control system are extended.

DETAILED DESCRIPTION

Possible monitoring measures on a wheel-slip control system include:
1. Hardware monitoring: The monitoring of the voltage level at one point of the electronic circuit may be possible here, for example.
2. Sensor monitoring: Since a wheel-slip control system may also include sensors (for example, wheel speed sensors, a transverse acceleration sensor, a steering angle sensor, a yaw rate sensor, pressure sensors, etc.), monitoring of the sensors may be possible. For instance, the output signal sent by a sensor may be monitored to find out whether the value of this signal or of the variable represented by this signal lies in a physically reasonable or possible range. Monitoring of the change over time of a variable represented by a sensor signal may also be possible.
3. Model-supported monitoring: Some variables are two-fold. They may be recorded by a sensor, and they may be determined from a mathematical model. A comparison of the variable obtained from the sensor signal with the variable determined from a mathematical model may be provided here. In the process, the scope of validity of the mathematical model may of course be observed, meaning that a comparison during a driving state in which the mathematical model is not valid may only have limited significance.

Figure 1:
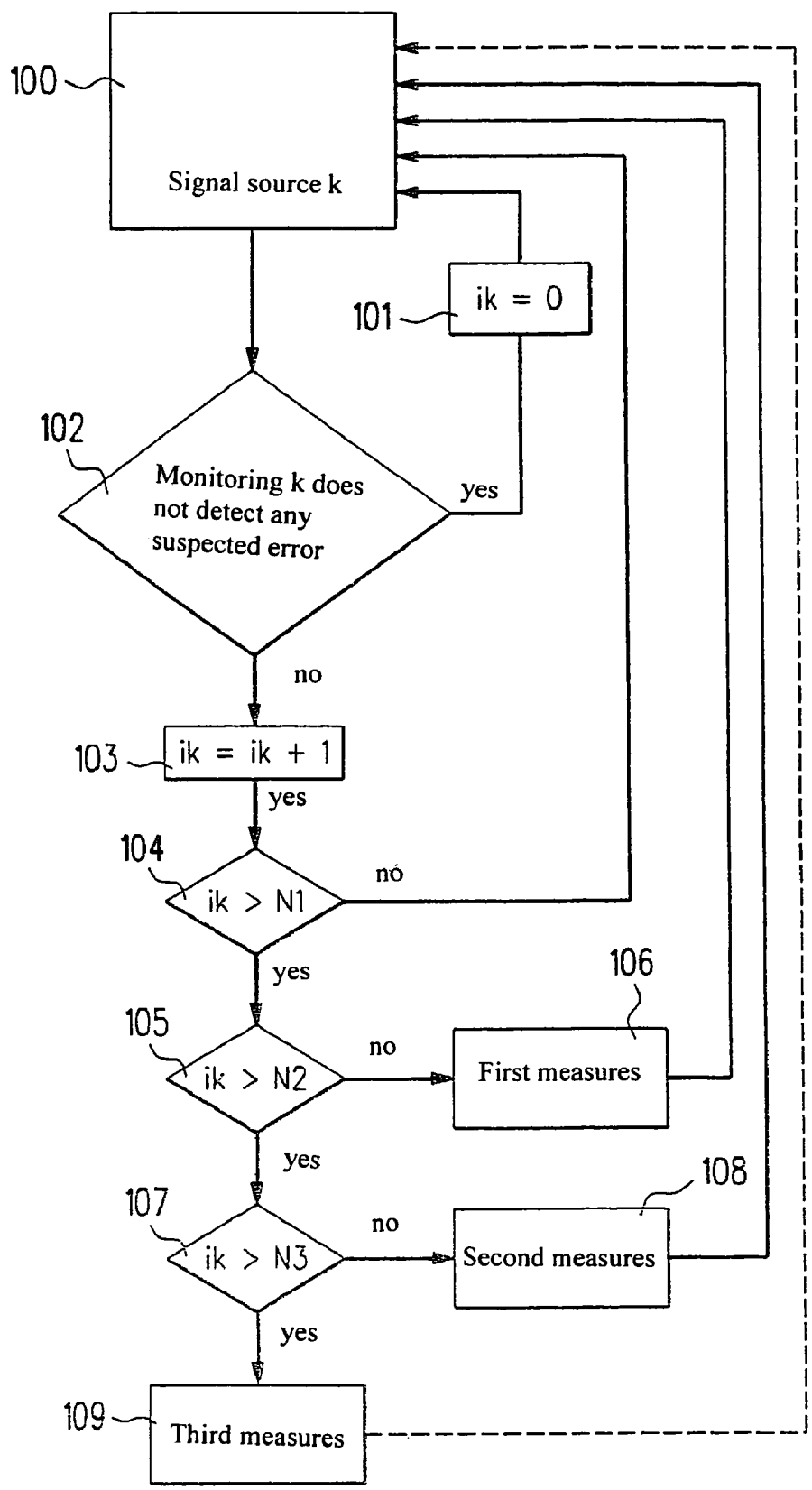
FIG. 1 shows the principle sequence of the exemplary method for treating a suspected error.

Separate error counters may be allocated to different, fundamentally possible errors. The fundamental procedure with respect to error counter k, which carries out a monitoring k, is illustrated in FIG. 1. Aside from error counter k, there may be other error counters 1, 2, 3, . . . , k−1, k+1, . . . , N, which carry out monitorings 1, 2, . . . , k−1, k+1, . . . , N. There may be N error counters provided altogether.

Block 100 represents a signal source k, which sends one or more output signals to block 102 for monitoring. This signal source may be a sensor, for example, or the voltage at a particular point in the electronic circuit of the wheel-slip control system, or the output signal of a mathematical model. The output variable(s) sent by this signal source k may be monitored in block 102. There may be a monitoring inquiry k for this purpose. Through this monitoring inquiry, it may be verified, for example, whether the output variable sent by signal source k is greater than a predeterminable limiting value. However, more complicated inquiries are also possible. For instance, it may be verified whether the output variable sent by signal source k is greater than a first predeterminable limiting value (=minimum value) and at the same time smaller than a second predeterminable limiting value (=maximum value).

It is also possible for signal source k to send multiple output signals, for example the output voltage to a connecting terminal of the wheel-slip control system as well as the temperature at a particular point of the wheel-slip control system. Combined monitoring inquiries are also consequently possible. Such a monitoring inquiry could involve verifying whether the temperature falls below a particular, predeterminable value and at the same time whether a voltage simultaneously exceeds another predeterminable value, for example.

Another combined monitoring inquiry may involve a comparison between the variable obtained from a sensor signal and the variable determined from a mathematical model.

According to a flow chart, block 100 may also be interpreted as reading in data. The type of this data was illustrated in the previous paragraph.

If monitoring inquiry 102 shows that the signal sent by signal source 100 fulfills all the conditions, i.e., it is plausible, error counter ik in block 101 may be reset to zero. Error counter ik may contain the number of times that monitoring inquiry k was not fulfilled as determined within an uninterrupted sequence. Afterwards, the output signals of signal source 100 may be monitored anew, i.e., at least one variable is read in.

However, if monitoring inquiry 102 shows that the output signal (or output signals) from block 100 does not fulfill all the required conditions, there may be an error. For this reason, value ik of the error counter may be increased by one in block 103. An inquiry as to whether ik>N1 takes place in block 104. Here, N1 may be a predeterminable limiting value. If this condition is not fulfilled, then there may be a branching back to block 100. If this condition is fulfilled, the next verification of ik may follow in block 105: ik>N2.

Here, N2 may be greater than N1.

If the condition in block 105 is not fulfilled, it means that ik is greater than N1 but less than N2. First measures are now therefore initiated in block 106. These first measures may involve a slowing down of the pressure build-up dynamics or pressure reduction dynamics of the wheel-slip control system, for example. Instead of pressure build-up and pressure reduction, these may be power buildup and power reduction, as is the case in the electromechanical brake.

This fact is explained briefly again:

Through ik>N1, it may be detected that there was probably an error in the wheel-slip control system.

But because ik may be even less than N2, it may not yet be certain that there is really an error.

The first measures described may therefore be initiated, for example.

The point of the first measures lies in the example that the wheel-slip control system may continue to perform all the necessary interventions, albeit somewhat slower. As a result, time may be gained for a further verification of the suspected error.

However, if ik>N2 in block 105, a further inquiry ik>N3 may subsequently follow in block 107. Here, N3>N2.

If ik is not greater than N3, second measures may be initiated in block 108 that may possibly have greater effects on the wheel-slip control system. In the example of a vehicle dynamics control system (ESP, FDR), this may mean that the intervention thresholds of some control interventions are increased or that some interventions are even completely prohibited.

If it is determined in block 107 that ik>N3, third measures may be initiated in block 109. These third measures may involve relevant functions of the wheel-slip control system being switched off or even the entire wheel-slip control system being switched off, for example. If ik>N3, there may be a strong likelihood of an error in the wheel-slip control system or in a component. Block 109 may be connected to block 100 through a broken line. This may have to do with the fact that a new monitoring cycle may begin again in block 100. However, it may also be possible to dispense with further monitorings in a completely switched off wheel-slip control system.

As discussed above, there may be separate error counters for separate errors. The method illustrated in FIG. 1 may also be logically transferable to the other error counters. In a particular embodiment, it may be possible for each of the first measures carried out to be identical when different counter errors have reached the appropriate limiting values. The same may also apply to the second and third measures.

However, it is may also be possible to carry out different measures, depending on the type of error detected (i.e., by the error counter).

Furthermore, it may be possible to individually select limiting values N1, N2 and N3 for all error counters. As a result, for non-serious errors it may be possible to select higher intervention limiting values N1, N2 and N3 than for serious errors, for example. However, it is may be possible for N1, N2 and N3 to assume the same values for all error counters.

In FIG. 1, the first, second, and third measures were taken as an example, depending on the status of the error counter. It may be possible to make the measures even more precisely graduated, i.e., there may be still fourth measures, fifth measures, etc. However, it may also be possible to make do with only two graduated measures.

Figure 2:
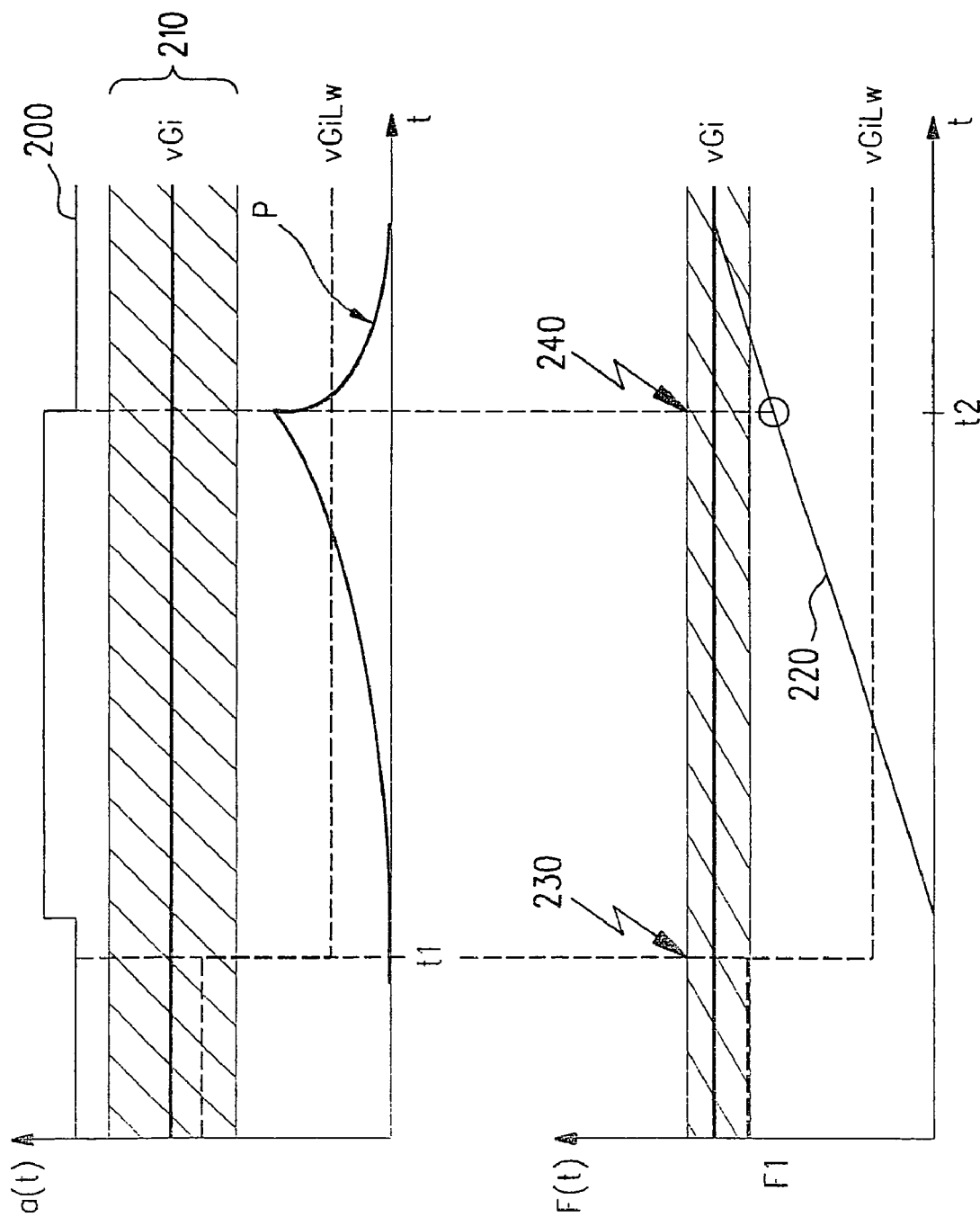
FIG. 2 shows a simple safety concept for a wheel-slip control system, in which the wheel-slip control system is switched off in the event of a known error.

Concrete exemplary embodiments of the safety concept discussed in general in FIG. 1 are illustrated in FIGS. 2 to 4. Since these figures are all quite similarly designed, the general design should first be explained. This assumes a wheel-slip control system designed as a vehicle dynamics control system.

Each of these figures is made up of two diagrams. In the upper diagram, different variables a(t) (ordinate) are respectively plotted as a function of time t (abscissa). This will now be explained in order.

The topmost signal 200 describes the state of the pump motor of the wheel-slip control system as a binary signal course. This is the motor of the return pump, which may provide the active pressure build-up (i.e., without assistance from the driver). If this signal assumes its 'low' value, the pump motor may be switched off. If the signal assumes the 'high' value, the pump motor may be switched on.

As the next signal, the yaw rate vGi measured with a yaw rate sensor is plotted. This may be assumed to be constant over time in all cases, i.e., there may be a horizontal straight line. The curly bracket 210 may indicate the hatched range specifying the allowed controller tolerance range of the yaw rate. This concept will be discussed later in greater detail.

As a third signal from above, yaw rate vGiLw calculated via a mathematical model is drawn with broken lines. The single-track model, also known as the Ackermann Function, may be suitable as a mathematical model, for example. The yaw rate may be computed therein from the steering angle, the vehicle longitudinal velocity, as well as other parameters.

As a fourth and final signal from above, variable p is drawn in as a function of time. p may be a measure of the built-up pressure in a selected wheel brake cylinder.

In the lower of the two diagrams, the measured yaw rate vGi, the computed yaw rate vGiLw, as well as the controller tolerance range of the yaw rate in hatched pattern are again drawn in. The controller tolerance range in the ordinate direction may be somewhat narrower than illustrated in the upper diagram. This is for reasons of clarity. However, the state of error counter F(t) was included as additional curve 220. In this situation, the state of the error counter may be shown as a continuously rising straight line for reasons of clarity. The state of the error counter may possibly be a discrete, whole number, i.e., this may also be a step function. This distinction may not be relevant for the following considerations, however.

FIG. 2 is discussed first. To this end, measured yaw rate vGi may first be compared in the upper diagram with computed yaw rate vGiLw. The validity of the mathematical model may be required over entire time axis t for computing yaw rate vGiLw. At time t1, a sensor error 230 (see lightning symbol in the lower diagram) of the steering angle sensor, for example, may occur. It may be assumed that the steering angle enters into the computation of yaw rate vGiLw. A sudden deviation between vGi and vGiLw therefore may occur at time t1. This deviation may be so great that vGiLw even drops out of the controller tolerance range of yaw rate vGi. This may have two consequences:

1. The vehicle dynamics control system may erroneously detect a deviation between the setpoint and the actual yaw rate. A control intervention may thus be started, recognizable by the switching on of the pump as well as by the accretion of pressure p in the upper diagram.

2. Value F(t) of the error counter allocated to this error in the lower diagram may begin to rise. This may have to do with the fact that with every repeated monitoring (see FIG. 1, block 102), a difference between the two yaw rates (vGi and vGiLw), and, consequently, another suspected error, may be determined. At time t=t2, the value of the error counter may have reached the value F1, i.e., the error is deemed detected with enough certainty. This is indicated by lightning symbol 240. The control intervention of the vehicle dynamics control system may therefore be terminated again at time t2. For that, pump 200 is switched off and pressure p may again taper off.

Lightning symbol 230 also appears in FIGS. 3 and 4 with the same meaning.

In FIG. 3, lightning symbol 250 is drawn in in addition to time t3 (with t3<t2). At time t3, the error counter may have already reached a first limiting value F2. The dynamic restriction of the pressure may therefore be activated at time t3 (first measure). This may be seen in the increase in pressure in the upper diagram, which may be more gradual than in FIG. 2. This may mean that the control intervention of the vehicle dynamics control system is taking place at a slower pace. At time t2, the error counter may have even reached the second (and higher) limiting value F1. A positive error may have now been detected and pressure p may again be reduced. As a result of the previous first measure, only a little pressure may need to be reduced. The effects of the erroneous brake application of the vehicle dynamics control system may have remained weaker than in FIG. 2.

A further exemplary embodiment of the present invention is illustrated in FIG. 4. At time t1, the control intervention of the vehicle dynamics control system may begin again erroneously. This may be seen in the upper diagram in pressure p, which has started to increase. The counter error reaches value F3 at time t4. A suspected error may be detected, characterized by lightning symbol 260. As a result of the suspected error, an extension of the intervention threshold of the vehicle dynamics control system may take place. This may be drawn with a hatched pattern in the upper diagram and marked with the curly bracket 211. Since the control tolerance range of the vehicle dynamics control system may have now become wider, the computed value vGiLw for t>t4 may once again fall within the control tolerance range of vGi. The intervention of the vehicle dynamics control system may therefore be cancelled. This may be seen in the pressure reduction in the upper diagram. At the same time, the pump may be again switched off. At time t5, the value of the error counter may exceed a second limiting value. This may be marked by lightning symbol 270. The error may now be deemed detected with certainty and second measures may be initiated.

As already mentioned, varied error counters for varied monitoring measures may be possible. Not only may a detected error be used to limit the functions of the wheel-slip control system, but the cause of the error may possibly be directly determined and logged, stored, or output as driver information in some form. This may facilitate a subsequent diagnosis, for example during a service inspection, and results in shortened service visits. This may bring about considerable cost savings.

In the present invention, it may be helpful to distinguish between two types of errors:

1. Component errors are the errors that may clearly be allocated to one component.
2. System errors are errors whose cause cannot be clearly determined.

The information on whether it is a component or a system error may therefore be allocated to each error counter. This information may be available for subsequent diagnosis.

Should an error that has been detected at least once suddenly no longer appear in the next monitoring (see block 102 in FIG. 1), the error counter may be reset to zero in FIG. 1 in block 101.

Alternatively, there may also be the following possibility for resetting the error counter:
   counting with the error counter may alway take place within an ignition cycle.
   when a monitoring-specific suspected error occurs, the error counter may be incremented by a predeterminable value, e.g., 1024. Since this may often be implemented as a filter, the use of a number associated with the filter may be recommended.
   if the suspected error is not reset, the error counter may be decremented each time by one bit in a 5.12-second pattern, for example. This may mean that after a time of 1024*5.12 seconds (approximately 1.5 hours), a suspected error that has been set once may be forgotten.

An exemplary embodiment of the present invention may have a useful operative range in motor vehicles equipped with an electrohydraulic brake. This may have shorter response times than a conventional hydraulic brake. A control intervention of a vehicle dynamics control system may then be noticeable to the driver when a brake pressure of approximately 20 bar has built up. A conventional hydraulic brake system may need about 200 milliseconds for this, while an electrohydraulic brake system may only need 20 milliseconds. Shortened error detection times may therefore be particularly advantageous here. The proposed, exemplary multistage error detection method may facilitate robust error detection almost regardless of the speed of the actuators.

Finally, some significant aspects of an exemplary embodiment of the present invention may be summarized:

The exemplary method is based on the concept of responding to a two-stage or multistage suspected error at the start of the error detection time.

In the first stage of suspecting an error, the pressure build-up dynamics may be limited. The effects of possible erroneous interventions (until the second stage of the suspected error is set) may consequently be reduced.

In the second stage of suspecting an error, the vehicle controller intervention thresholds may be extended. With this measure, vehicle control interventions may be suppressed and time may be gained for robust and certain detection of the error.

Since there may be more time for error detection (longer error detection time), it may be easier to clearly allocate system errors to component errors.

Counting the occurrence of a suspected error may also allow the recording of errors caused by a loose connection.

What is claimed is:

1. A method for producing at least one error signal and performing at least one measure based on the at least one error signal in a motor vehicle equipped with at least one of a wheel-slip control system and a wheel deceleration control system, comprising:
   monitoring for at least one error in at least one function variable, the at least one function variable representing a functionality of the at least one of the wheel-slip control system and the wheel deceleration control system;
   incrementing a value of at least one error counter if the at least one error is detected; and
   outputting the at least one error signal when the value of the at least one error counter exceeds a predetermined limiting value, wherein, for the at least one error counter, at least a first and a second predetermined limiting values coexist simultaneously, and wherein a first error signal is output when the first limiting value is exceeded by a counter reading of the at least one error counter, and a second, different error signal is output when the second limiting value is exceeded by a counter reading of the at least one error counter; and
   wherein, in response to the first and second error signals, correspondingly different measures are performed in the at least one of the wheel-slip control system and the wheel deceleration control system.

2. The method of claim 1, wherein the at least one of the wheel-slip control system and the wheel deceleration control system includes a vehicle dynamics control system, the vehicle dynamics control system regulating at least one variable representing a vehicle dynamics, toward a desired state.

3. The method of claim 1, wherein the monitoring of the at least one function variable is performed so that a verification of a fulfillment of at least one given condition is performed.

4. The method of claim 1, wherein a slowing down of at least one of a braking force buildup procedure and a braking force reduction procedure is performed in a wheel brake as a first measure when a lowest limiting value is exceeded by the at least one error counter.

5. The method of claim 4, wherein a second measure is performed when a second lowest limiting value is exceeded by the at least one error counter, the second measure being at least one of:
  a greater deviation of at least one variable representing a vehicle dynamics from a desired state is permitted before a control intervention of the vehicle dynamics control system is performed; and
  at least one control intervention of the vehicle dynamics control system is completely prohibited.

6. The method of claim 3, wherein the monitoring of at least one function variable is performed so that a first variable represented by an output signal of a vehicle sensor is compared with a second variable calculated using a mathematical model.

7. The method of claim 6, further comprising:
  comparing, only during certain driving states, the first variable to the second variable.

8. The method of claim 1, wherein the at least one function variable includes one of:
  a voltage at one point of an electronic circuit of the at least one of the wheel-slip control system and the wheel deceleration control system;
  an output signal of a sensor; and
  a variable calculated from a mathematical model.

9. A device for producing at least one error signal and carrying out at least one measure based thereon in a motor vehicle equipped with at least one of a wheel-slip control system and a wheel deceleration control system, comprising:
  a monitoring arrangement adapted to monitor for at least one error in at least one function variable, the at least one function variable representing a functionality of the at least one of the wheel-slip control system and the wheel-deceleration control system;
  an error counter adapted to increment an error count if the at least one error is detected; and
  an error-signal producing arrangement for outputting the at least one error signal when the value of the error counter exceeds a predetermined limiting value, wherein, for the at least one error counter, at least a first and a second predetermined limiting values coexist simultaneously, and wherein a first error signal is output when the first limiting value is exceeded by a counter reading of the at least one error counter, and a second, different error signal is output when the second limiting value is exceeded by a counter reading of the at least one error counter; and
  wherein, in response to the first and second error signals, correspondingly different measures are performed in the at least one of the wheel-slip control system and the wheel deceleration control system.

* * * * *